I. O. JOHNSON.
SECURING DEVICE FOR WHEELS.
APPLICATION FILED SEPT. 10, 1910.
993,172.
Patented May 23, 1911.
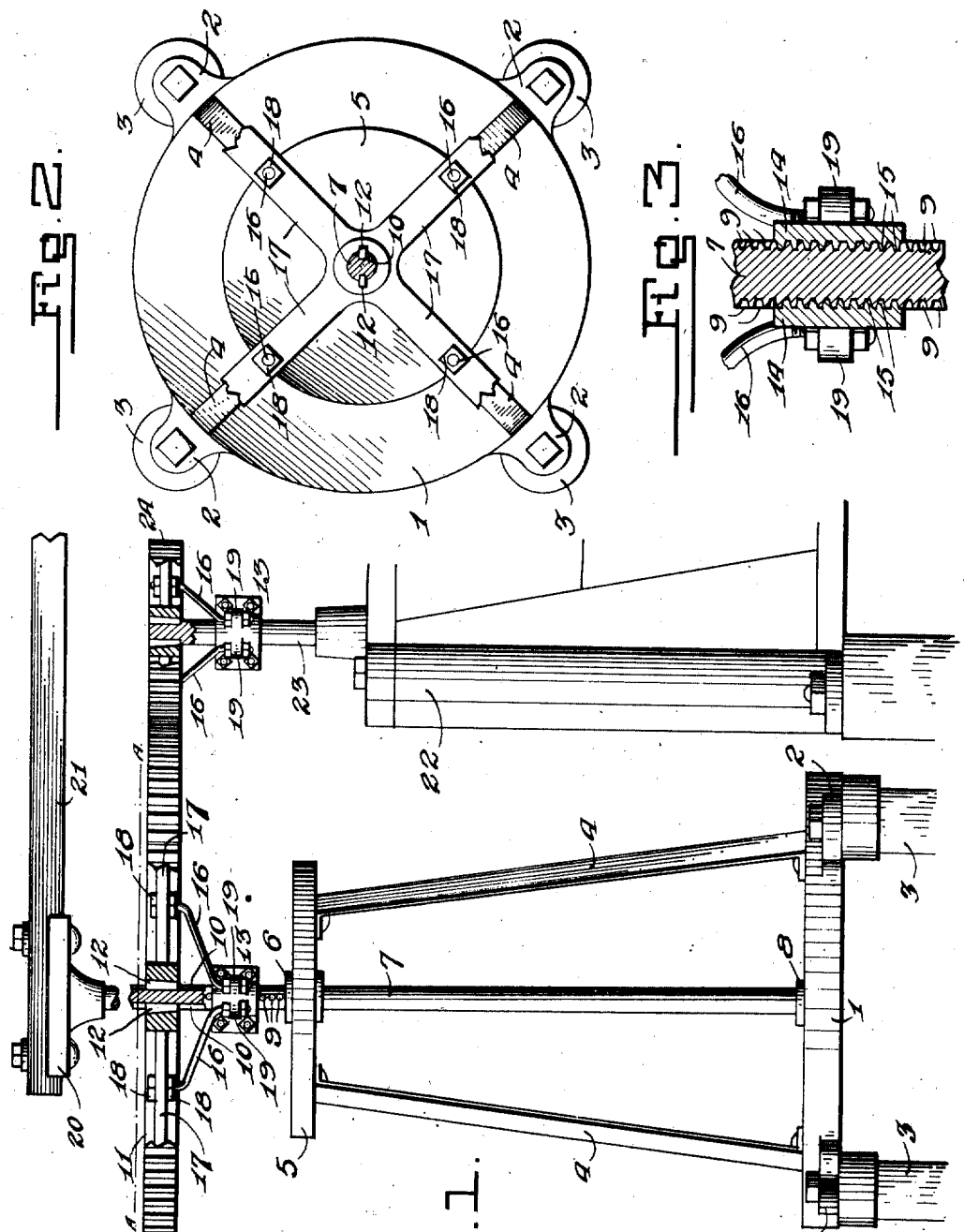
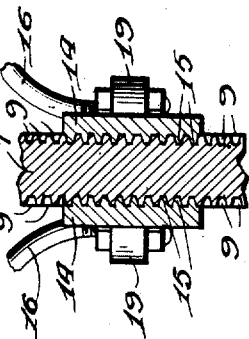
Inventor
Isaac O. Johnson.

UNITED STATES PATENT OFFICE.

ISAAC OLIVER JOHNSON, OF KIRKLAND, GEORGIA.

SECURING DEVICE FOR WHEELS.

993,172.   Specification of Letters Patent.   Patented May 23, 1911.

Application filed September 10, 1910. Serial No. 581,438.

*To all whom it may concern:*

Be it known that I, ISAAC OLIVER JOHNSON, a citizen of the United States, residing at Kirkland, in the county of Coffee and State of Georgia, have invented certain new and useful Improvements in Securing Devices for Wheels, of which the following is a specification, reference being had therein to the accompanying drawing.

The invention has for its object to provide an improved means for holding a wheel upon a shaft.

The invention is illustrated in the accompanying drawings wherein:—

Figure 1 is a view showing the improved driving mechanism as it would appear applied to a mill. Fig. 2 is a view along the line A—A of Fig. 1 looking down, the spokes of the king wheel being broken away. Fig. 3 is an enlarged sectional view showing the manner of securing the collar to the shaft.

Referring to the accompanying drawings by numerals:—it will be seen that the improved device comprises a platform 1 which is provided with a number of outwardly extending lugs 2 by means of which the platform is secured to posts 3. Vertical standards 4 are secured to the base 1 adjacent to the lugs 2 and at their upper ends are secured to a second platform 5 which is provided at its center with a bearing 6. A vertical shaft 7 is passed through the bearing 6 and has its lower end resting in a socket 8. At its upper end the shaft is provided with a series of notches 9, and also with longitudinally extending grooves 10.

A king wheel 11 is provided in the inner surface of its hub with slots which register with the slots 10 and the wheel is held in place by having tapered lugs 12 driven through the slots and secured in place.

A collar 13 composed of a pair of plates 14 is secured around the shaft 7 and the inner surface of each of the plates is provided with lugs 15 which enter the notches 9 and thus prevent the collar from slipping.

Bracing arms 16, are secured at their upper ends to the spokes 17 of the king wheel by means of nuts 18 and at their lower ends are fitted into ears 19, said ears being formed upon the plates 14. A socket piece 20 is secured to the upper end of the shaft 7 and a sweep beam 21 is secured into the socket 20. The mill 22 is provided with a shaft 23 upon the upper end of which is secured a smaller king wheel 24. The king wheel 24 is constructed exactly similar to the wheel 11 and is secured upon the shaft in the same manner. The teeth of the king wheels mesh, so that when the wheel 11 is turned, the wheel 24 will be revolved a greater number of times than the larger king wheel.

Having described the invention, I claim:—

1. A device of the character described comprising a shaft, one end of said shaft being provided with a series of notches and a plurality of longitudinal slots, a wheel provided in its hub with slots registering with said longitudinal slots, lugs fitted into said slots to retain said wheel in place, and bracing means fitted upon said shaft and provided with lugs fitted within said notches.

2. A device of the character described comprising a shaft, one portion of said shaft being provided with a series of notches, a wheel secured upon said shaft above said notches, a collar for said shaft comprising a pair of plates, the inner surface of each of said plates being provided with a series of lugs fitted within said notches, ears formed upon said outer surface of said plates, bracing bars, the upper end of said bars being secured to the spokes of said wheel, and the lower ends being held within said ears.

3. A device of the character described comprising a shaft, one end portion of said shaft being provided with longitudinal slots and with a plurality of longitudinal sets of notches, a pair of plates secured together surrounding said shaft, the inner surfaces of said plates being provided with teeth registering with said sets of notches to rigidly hold said plates in place, said plates provided at their outer surfaces with a plurality of ears, a wheel mounted upon said shaft, and provided with slots registering near the slots of said shaft, securing keys fitted within said alined slots, and a plurality of supporting arms secured at one end to the spokes of said wheel and at the other end secured to said plate ears.

In testimony whereof I hereunto affix my signature in presence of two witnesses.

ISAAC OLIVER JOHNSON.

Witnesses:
 WM. C. GIDDENS,
 GEORGE JOHNSON.